(12) United States Patent
Chen

(10) Patent No.: US 11,916,432 B2
(45) Date of Patent: Feb. 27, 2024

(54) CHIP WITH POWER-GLITCH DETECTION

(71) Applicant: MEDIATEK INC., Hsinchu (TW)

(72) Inventor: Pin-Wen Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/935,245

(22) Filed: Sep. 26, 2022

(65) Prior Publication Data
US 2023/0216333 A1    Jul. 6, 2023

Related U.S. Application Data

(60) Provisional application No. 63/296,502, filed on Jan. 5, 2022.

(51) Int. Cl.
| | |
|---|---|
| G06F 1/26 | (2006.01) |
| G01R 19/00 | (2006.01) |
| G06F 1/28 | (2006.01) |
| G06F 1/30 | (2006.01) |
| H02J 9/06 | (2006.01) |
| H03K 3/037 | (2006.01) |
| H03K 19/20 | (2006.01) |

(52) U.S. Cl.
CPC .......... *H02J 9/061* (2013.01); *G01R 19/0084* (2013.01); *G06F 1/28* (2013.01); *G06F 1/30* (2013.01); *H03K 3/037* (2013.01); *H03K 19/20* (2013.01)

(58) Field of Classification Search
CPC ..... G06F 1/24; G06F 1/26; G06F 1/28; G06F 1/30; G06F 1/305; H03K 3/037; H03K 19/20; H02J 9/04; H02J 9/06; H02J 9/061; G01R 19/0084
See application file for complete search history.

(56) References Cited

U.S. PATENT DOCUMENTS

| | | | |
|---|---|---|---|
| 11,609,277 B2 | 3/2023 | Xue et al. | |
| 11,671,083 B2* | 6/2023 | Shlomo | G11C 7/02 327/551 |
| 2006/0284655 A1* | 12/2006 | Li | G06F 1/28 327/143 |

(Continued)

FOREIGN PATENT DOCUMENTS

| | | |
|---|---|---|
| CN | 101943729 A | 1/2011 |
| CN | 103675428 A | 3/2014 |

(Continued)

OTHER PUBLICATIONS

Chinese language Notice of Allowance dated Mar. 21, 2023, issued in application No. TW 111142918.

(Continued)

*Primary Examiner* — Long Nguyen
(74) *Attorney, Agent, or Firm* — McClure, Qualey & Rodack, LLP

(57) ABSTRACT

A chip with power-glitch detection is provided, which includes a power terminal receiving power, an inverter, and a back-up power storage device coupled to the power terminal. The inverter has an input terminal coupled to the power terminal. The back-up power storage device transforms the power to back-up power. The inverter is powered by the back-up power when a power glitch occurs on the power terminal, and the power glitch is reflected at an output terminal of the inverter.

17 Claims, 6 Drawing Sheets

(56) References Cited

U.S. PATENT DOCUMENTS

| | | |
|---|---|---|
| 2015/0015283 A1 | 1/2015 | Park et al. |
| 2021/0004501 A1 | 1/2021 | Xue et al. |
| 2021/0048455 A1 | 2/2021 | Xue et al. |
| 2022/0014180 A1* | 1/2022 | Shlomo .................... G11C 7/02 |

FOREIGN PATENT DOCUMENTS

| | | |
|---|---|---|
| CN | 104459564 A | 3/2015 |
| CN | 107462827 A | 12/2017 |
| CN | 110462415 A | 11/2019 |
| WO | 2022/010728 A1 | 1/2022 |

OTHER PUBLICATIONS

Extended European Search Report dated May 26, 2023, issued in application No. EP 22213293.8.
Gomina, K., et al.; "Power supply glitch attacks: Design and evaluation of detection circuits;" IEEE; Jul. 2014; pp. 136-141.
Thomson, N., et al.; "On-Chip monitors of supply noise generated by system-level ESD;" Oct. 2017; pp. 1-10.

\* cited by examiner

CHIP WITH POWER-GLITCH DETECTION

CROSS REFERENCE TO RELATED APPLICATIONS

This application claims the benefit of U.S. Provisional Application No. 63/296,502, filed Jan. 5, 2022 the entirety of which is incorporated by reference herein.

BACKGROUND OF THE INVENTION

Field of the Invention

The present invention relates to power-glitch detection on a chip.

Description of the Related Art

Today, hackers may employ a power-glitch attack, which is a sophisticated attack that aims to confuse a chip in an electronic device into revealing its secrets.

How to detect such malicious attacks is an important issue in the system-on-chip (SoC) design.

BRIEF SUMMARY OF THE INVENTION

Chips with power-glitch detection are shown.

A chip in accordance with an exemplary embodiment of the present invention has a power terminal receiving power, a first inverter, and a back-up power storage device coupled to the power terminal. The first inverter has an input terminal coupled to the power terminal. The back-up power storage device transforms the power to back-up power. The first inverter is powered by the back-up power when a power glitch occurs on the power terminal, and the power glitch is reflected at an output terminal of the first inverter.

In an exemplary embodiment, the back-up power storage device has a resistor and a capacitor which are connected in series. A connection terminal between the resistor and the capacitor is coupled to the first inverter to provide the back-up power to power the first inverter when a power glitch occurs.

In an exemplary embodiment, the chip has a latch for presenting a detection result indicating a power glitch. The latch has a positive output terminal that is at a low level before the power glitch, and a negative output terminal that is at a high level before the power glitch. The latch further has a first capacitor coupling the positive output terminal to the power terminal to pull up the voltage level of the positive output terminal after the power glitch, and the latch further has a second capacitor coupling the negative output terminal to a ground terminal. In an exemplary embodiment, a power glitch is detected when the positive output terminal is at the high level and the negative output terminal is at the low level.

In another exemplary embodiment, the chip has a D flip-flop rather than the forgoing latch. The D flip-flop has a D terminal coupled to the output terminal of the first inverter, a clock terminal coupled to the power terminal, and a Q terminal. In an exemplary embodiment, a power glitch is detected when the Q terminal of the D-flip-flop is at a high level.

In another exemplary embodiment, the chip has a second inverter that is coupled to the first inverter to form a first latch for latching an output of the first inverter. The chip further has a reset circuit, operative to reset the latch (formed by the first and second inverters) for detection of the next power glitch.

In another exemplary embodiment, the first latch further comprises an NMOS that has a gate terminal coupled to an output terminal of the second inverter, a drain terminal coupled to a drain terminal of a PMOS of the first inverter, and a source terminal coupled to a drain terminal of an NMOS of the first inverter. The output terminal of the first inverter is coupled to an input terminal of the second inverter.

In an exemplary embodiment, the first inverter and the back-up power storage device are provided within one glitch detection unit (GDU), and the chip is a system-on-chip (SoC) chip. Each of the processors embedded on the SoC chip has multiple power terminals for receiving power, and each power terminal is connected to a corresponding glitch detection unit.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
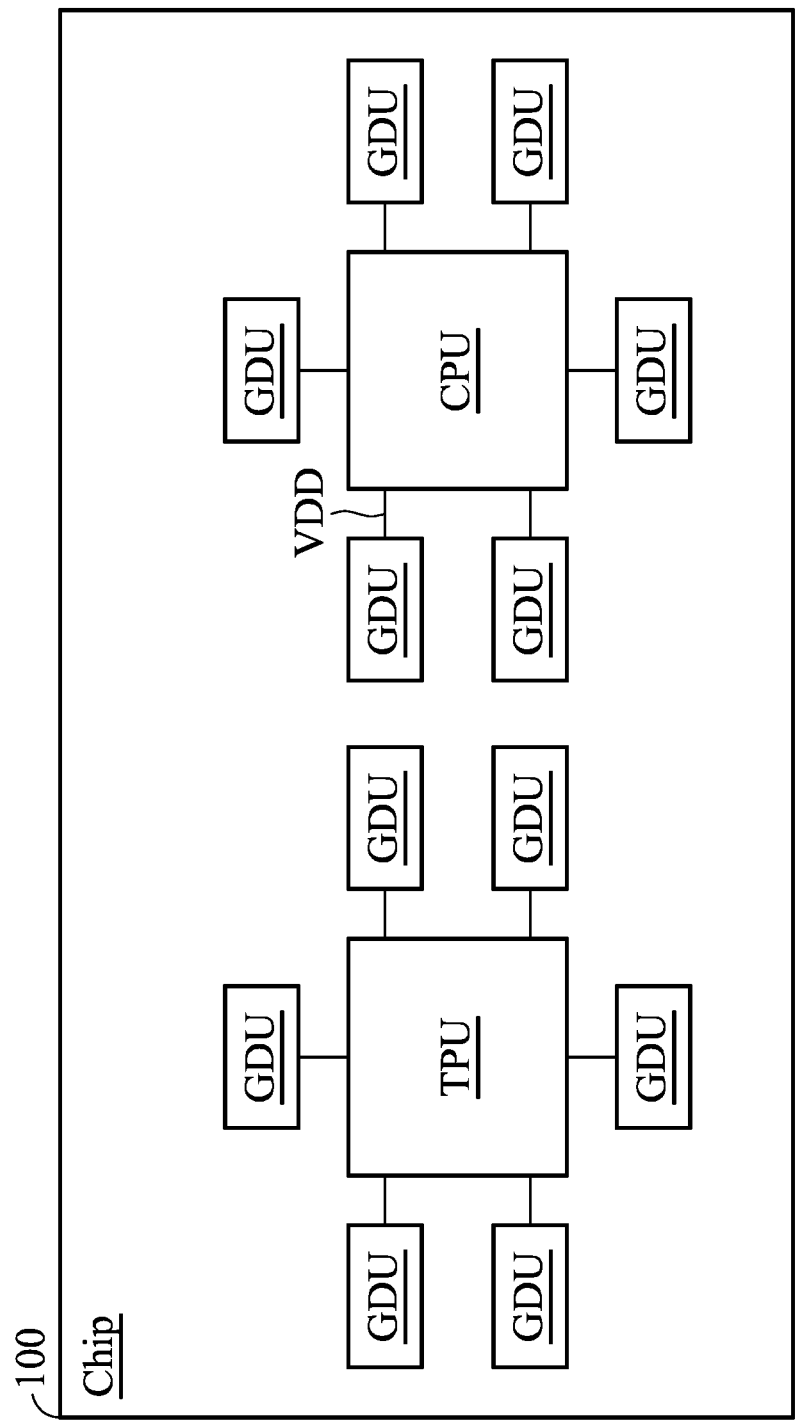
FIG. 1 shows a chip with a system-on-chip (SoC) design.

FIG. 1 shows a chip with a system-on-chip (SoC) design. The chip 100 has more than one processors (e.g., a central processing unit CPU, a tensor processing unit TPU, and so on) embedded thereon. Each processor has multiple power terminals for receiving power (VDD), and each power terminal is coupled to a corresponding glitch detection unit GDU for detection of power glitch.

Figure 2:
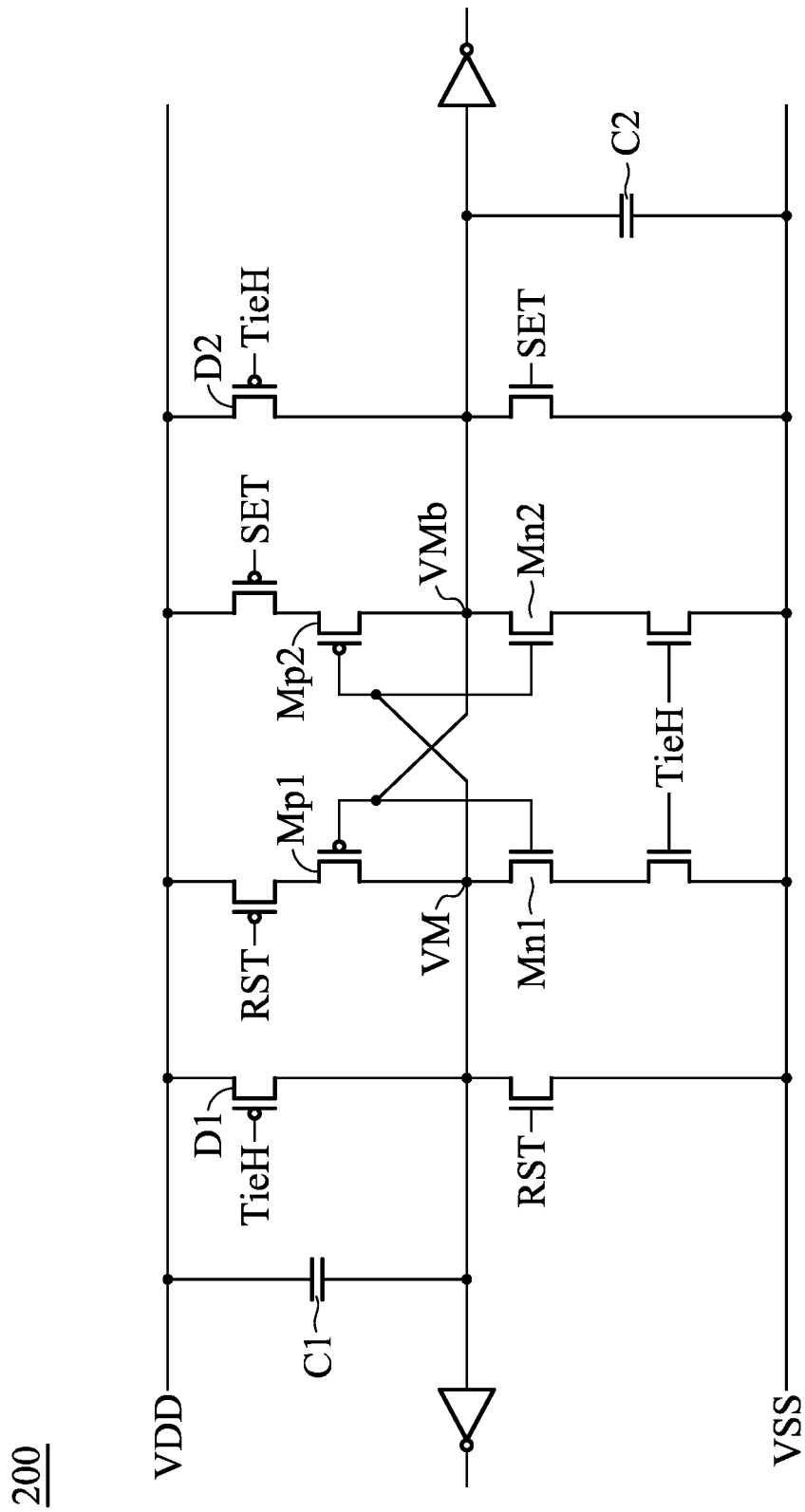
FIG. 2 shows a part of a GDU, which is a latch 200 for presenting a detection result indicating a power glitch.

FIG. 2 shows a part of a GDU, which is a latch 200 for presenting a detection result indicating a power glitch. A first PMOS (p-type metal-oxide-semiconductor) Mp1 and a first NMOS (n-type metal-oxide-semiconductor) Mn1 form an inverter. A second PMOS Mp2 and a second NMOS Mn2 form another inverter. The first PMOS Mp1 has a source terminal coupled to the power terminal VDD. The first NMOS Mn1 has a drain terminal coupled to a drain terminal of the first PMOS Mp1 as a positive output terminal VM of the latch 200, a gate terminal coupled to a gate terminal of the first PMOS Mp1, and a source terminal coupled to a ground terminal VSS. The second PMOS Mp2 has a source terminal coupled to the power terminal VDD. The second NMOS Mn2 has a drain terminal coupled to a drain terminal of the second PMOS Mp2 as a negative output terminal VMB of the latch 200, a gate terminal coupled to a gate terminal of the second PMOS Mp2, and a source terminal coupled to the ground terminal VSS. The gate terminals of the first PMOS Mp1 and the first NMOS Mn1 are connected to the drain terminals of the second PMOS Mp2 and the second NMOS Mn2. The gate terminals of the second PMOS Mp2 and the second NMOS Mn2 are connected to the drain terminals of the first PMOS Mp1 and the first NMOS Mn1.

The latch 200 further has reset (controlled by RST signal) and set (controlled by SET) designs, and MOSs tied high as diodes. Before a power glitch occurs on the power terminal VDD, the positive output terminal VM is at a low level, and the negative output terminal VMB is at a high level. The latch 200 further has a first capacitor C1 coupling the positive output terminal VM to the power terminal VDD to pull up the voltage level of the positive output terminal VM after the power glitch, and the latch 200 further has a second capacitor C2 coupling the negative output terminal VMB to the ground terminal VSS. A power glitch is detected when the positive output terminal VM has been switched from the low level to the high level and the negative output terminal VMB has been switched from the high level to the low level.

Figure 3:
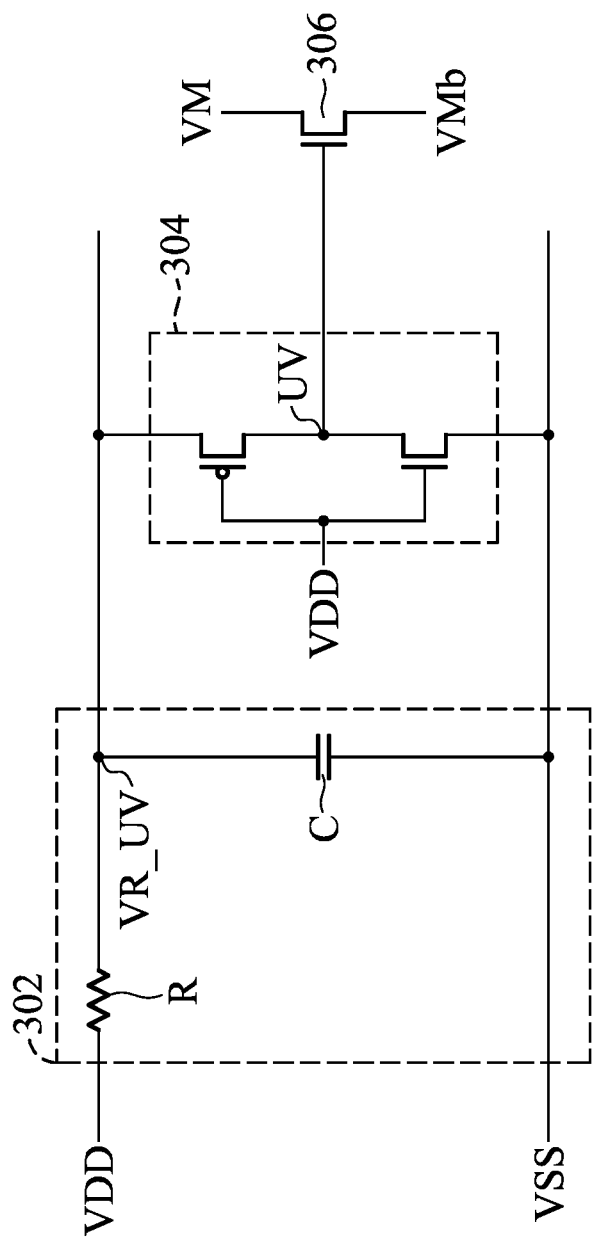
FIG. 3 illustrates another important part of each glitch detection unit GDU to certainly pull-down the voltage level of the negative output terminal VMB.

With the supply voltage of semiconductor is lower than lower today, the discharging capability of MOSs may be too weak to timely discharge the negative output terminal VMB to the low level during a short glitch duration. The power-glitch detection may fail. FIG. 3 illustrates another important part of each glitch detection unit GDU to certainly pull-down the voltage level of the negative output terminal VMB.

As shown in FIG. 3, a glitch detection unit GDU further has a back-up power storage device 302, an inverter 304, and an NMOS switch 306. The NMOS switch 306 is closed according to an output (UV) of the inverter 304 to connect the negative output terminal VMB of the latch 200 to the positive output terminal VM of the latch 200.

The back-up power storage device 302 coupled to the power terminal VDD transforms the power VDD to back-up power VR_UV. The inverter 304 has an input terminal coupled to the power terminal VDD. The inverter 304 is powered by the back-up power VR_UV when a power glitch occurs on the power terminal (VDD). The power glitch is reflected at an output terminal UV of the inverter 304 and, accordingly, the NMOS switch 306 is closed, and the negative output terminal VMB of the latch 200 is connected to the positive output terminal VM of the latch 200.

Figure 4:
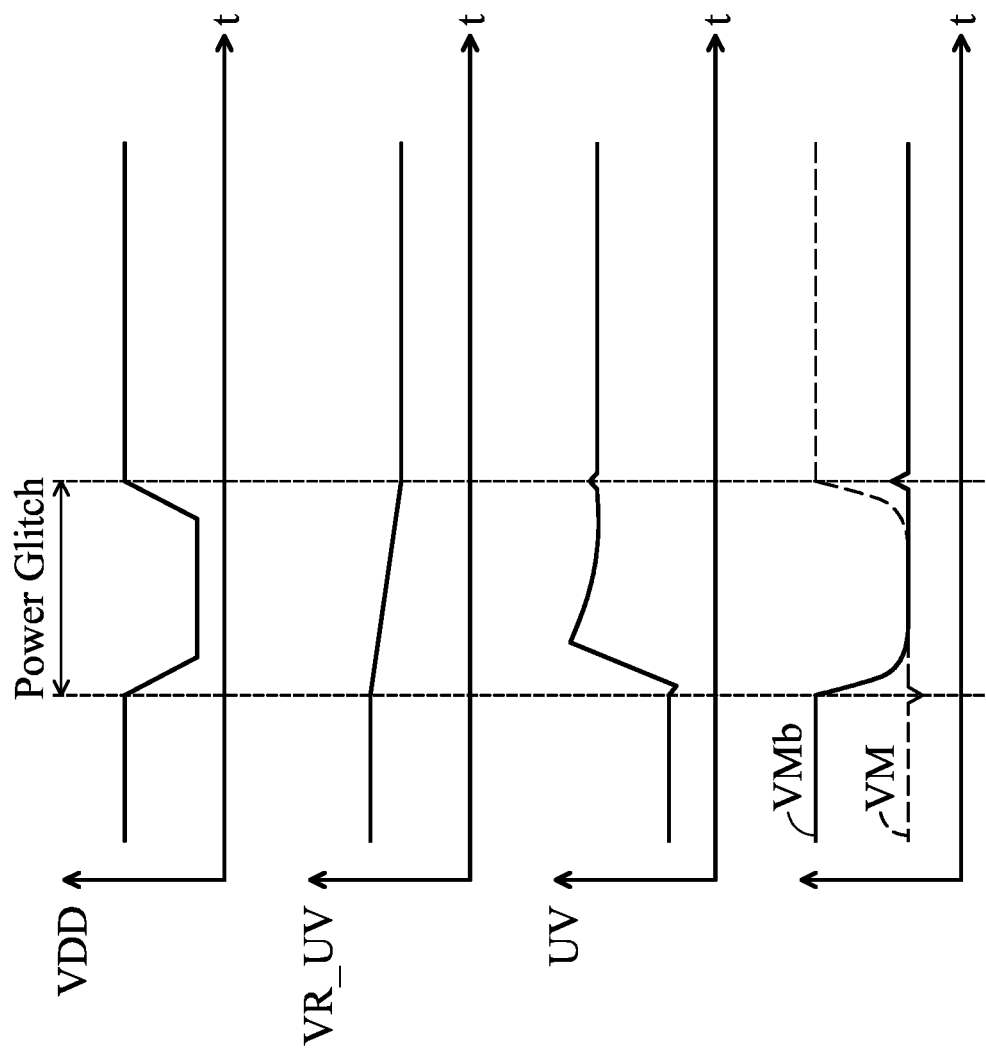
FIG. 4 shows waveforms of the signals related to a glitch detection unit GDU.

FIG. 4 shows waveforms of the signals related to a glitch detection unit GDU. In comparison with the weak discharging capability provided by the tie high MOSs of FIG. 2, the inverter 304 powered by the back-up power VR_UV can quickly react once the power glitch occurs on VDD. The output (UV) of the inverter 304 quickly changes from low to high to turn on the NMOS switch 306 to connect the negative output terminal VMB of the latch 200 to the negative output terminal VM of the latch 200. Thus, VMB and VM both are tied to low once the power glitch occurs. After the power glitch, the first capacitor C1 of FIG. 2 pulls up the voltage level of VM. The high-level VM and the low-level VMB correctly show the detected power glitch.

Because of the circuit of FIG. 3, the MOSs (tied high as diodes D1 and D2) of the latch 200 are not necessary. In some exemplary embodiments, the MOSs tied high as diodes D1 and D2 are removed from the latch 200.

The latch 200 and the NMOS switch 306 are optional. In some exemplary embodiments, a power glitch can be directly observed from the output (UV) of the inverter 304.

In FIG. 3, the back-up power storage device 302 has a resistor R and a capacitor C which are connected in series. A connection terminal between the resistor R and the capacitor C is coupled to the inverter 304 to provide the back-up power VR_UV to power the inverter 304 when a power glitch occurs.

Modifications may be made on the back-up power storage device 302, the inverter 304, or the NMOS switch 306.

Figure 5:
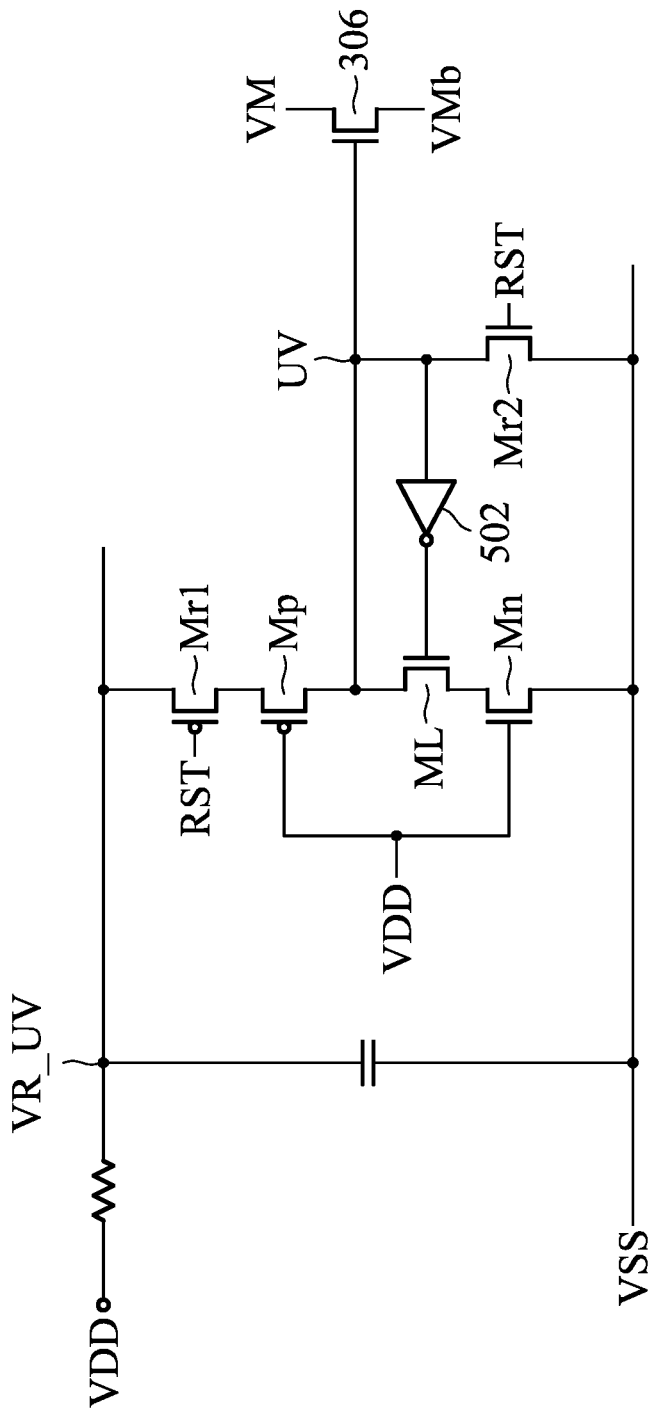
FIG. 5 shows another circuit operative to connect the two terminals VM and VMB in response to a power glitch.

FIG. 5 shows another circuit operative to connect the two terminals VM and VMB in response to a power glitch. In addition to a first inverter formed by an NMOS Mn and a PMOS Mp, FIG. 5 further shows a second inverter 502. The second inverter 502 is coupled to the first inverter (Mn and Mp) to form a latch for latching the output (UV) of the first inverter. In this way, the output UV is kept at its ideal level without being discharged by the parasitic components. The control of the NMOS switch 306 is more reliable.

To reset the latch (shown in FIG. 5) for detection of the next power glitch, a reset circuit is proposed. As shown, the reset circuit includes a first reset transistor Mr1 and a second reset transistor Mr2. The first reset transistor Mr1 is a PMOS for disconnecting the back-up power VR_UV from the first inverter (Mn and Mp) when a reset signal RST is asserted, and the second reset transistor Mr2 is an NMOS for connecting the output terminal UV of the first inverter to a ground terminal VSS when the reset signal RST is asserted.

In FIG. 5, the latch further has an NMOS ML that has a gate terminal coupled to an output terminal of the second inverter 502, a drain terminal coupled to a drain terminal of the PMOS Mp of the first inverter, and a source terminal coupled to a drain terminal of the NMOS Mn of the first inverter. The output terminal UV of the first inverter is coupled to an input terminal of the second inverter 502.

Figure 6:
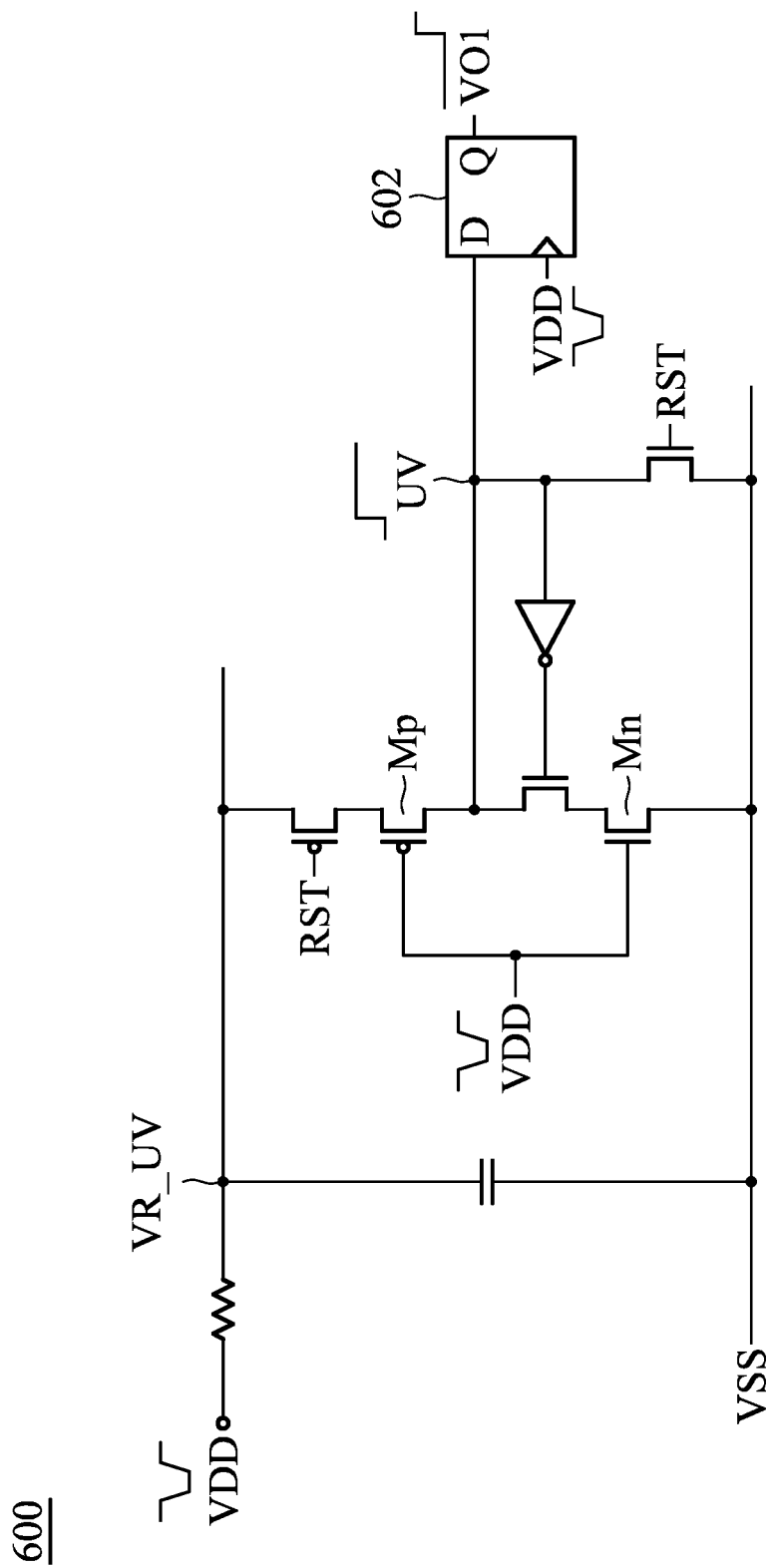
FIG. 6 shows a glitch detection unit (GDU) in accordance with another exemplary embodiment.

FIG. 6 shows a glitch detection unit (GDU) in accordance with another exemplary embodiment. Different from the latch 200 shown in FIG. 2, a D flip-flop 602 is proposed and is controlled by the signal UV. The D flip-flop 602 has a D terminal coupled to the output terminal UV of the first inverter (Mp and Mn), a clock terminal coupled to the power terminal VDD, and a Q terminal outputting a signal VO1. In response to a power glitch, the signal VO1 is asserted. A power glitch is detected when the Q terminal of the D-flip-flop 602 is at a high level.

The output signal UV generated in the circuit of FIG. 2 can be used to control the D-flip-flop 602 rather than controlling the NMOS switch 306.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A chip with power-glitch detection, comprising:
a power terminal, receiving power;
a first inverter having an input terminal coupled to the power terminal; and
a back-up power storage device coupled to the power terminal, transforming the power to back-up power, wherein the first inverter is powered by the back-up power when a power glitch occurs on the power terminal, and the power glitch is reflected at an output terminal of the first inverter;
a latch for presenting a detection result indicating the power glitch, having a positive output terminal that is at a low level before the power glitch, and a negative output terminal that is at a high level before the glitch; and
a switch, closed when the power glitch is reflected at the output terminal of the first inverter, to connect the negative output terminal of the latch to the positive output terminal of the latch;
wherein the latch further has a first capacitor coupling the positive output terminal to the power terminal to pull up a voltage level of the positive output terminal after the power glitch, and the latch further has a second capacitor coupling the negative output terminal to a ground terminal.

2. The chip with power-glitch detection as claimed in claim 1, wherein:
the back-up power storage device comprises a resistor and a capacitor which are connected in series; and
a connection terminal between the resistor and the capacitor is coupled to the first inverter to provide the back-up power to power the first inverter when the power glitch occurs.

3. The chip with power-glitch detection as claimed in claim 1, wherein:
the power glitch is detected when the positive output terminal is at the high level and the negative output terminal is at the low level.

4. The chip with power-glitch detection as claimed in claim 1, wherein the latch comprises:
a first PMOS, having a source terminal coupled to the power terminal;
a first NMOS, having a drain terminal coupled to a drain terminal of the first PMOS as the positive output terminal of the latch, a gate terminal coupled to a gate terminal of the first PMOS, and a source terminal coupled to the ground terminal;
a second PMOS, having a source terminal coupled to the power terminal;
a second NMOS, having a drain terminal coupled to a drain terminal of the second PMOS as the negative output terminal of the latch, a gate terminal coupled to a gate terminal of the second PMOS, and a source terminal coupled to the ground terminal;
wherein:
the gate terminals of the first PMOS and the first NMOS are connected to the drain terminals of the second PMOS and the second NMOS; and
the gate terminals of the second PMOS and the second NMOS are connected to the drain terminals of the first PMOS and the first NMOS.

5. The chip with power-glitch detection as claimed in claim 4, wherein:
the switch, closed when the power glitch is reflected at the output terminal of the first inverter to connect the negative output terminal of the latch to the positive output terminal of the latch, is an NMOS switch.

6. The chip with power-glitch detection as claimed in claim 5, wherein:
the power glitch is detected when the positive output terminal is at the high level and the negative output terminal is at the low level.

7. The chip with power-glitch detection as claimed in claim 1, further comprising:
a D flip-flop, having a D terminal coupled to the output terminal of the first inverter, a clock terminal coupled to the power terminal, and a Q terminal,
wherein the power glitch is detected when the Q terminal of the D-flip-flop is at the high level.

8. The chip with power-glitch detection as claimed in claim 1, further comprising:
a second inverter, coupled to the first inverter to form a first latch for latching an output of the first inverter; and
a reset circuit, resetting the first latch for detection of a next power glitch.

9. The chip with power-glitch detection as claimed in claim 8, wherein:
the reset circuit comprises a first reset transistor and a second reset transistor, wherein the first reset transistor is a PMOS for disconnecting the back-up power from the first inverter when a reset signal is asserted, and the second reset transistor is an NMOS for connecting the output terminal of the first inverter to the ground terminal when the reset signal is asserted.

10. The chip with power-glitch detection as claimed in claim 8, wherein:
the first latch further comprises an NMOS that has a gate terminal coupled to an output terminal of the second inverter, a drain terminal coupled to a drain terminal of a PMOS of the first inverter, and a source terminal coupled to a drain terminal of an NMOS of the first inverter; and
the output terminal of the first inverter is coupled to an input terminal of the second inverter.

11. The chip with power-glitch detection as claimed in claim 10, wherein:
the power glitch is detected when the positive output terminal is at the high level and the negative output terminal is at the low level.

12. The chip with power-glitch detection as claimed in claim 10, further comprising:
a D flip-flop, having a D terminal coupled to the output terminal of the first inverter, a clock terminal coupled to the power terminal, and a Q terminal,
wherein the power glitch is detected when the Q terminal of the D-flip-flop is at the high level.

13. The chip with power-glitch detection as claimed in claim 1, wherein:
the first inverter and the back-up power storage device are provided within a single glitch detection unit;
the chip is a system-on-chip chip; and
each of processors embedded on the system-on-chip chip has multiple power terminals for receiving the power, and each power terminal is connected to a corresponding glitch detection unit.

14. A chip with power-glitch detection, comprising:
a power terminal, receiving power;
a first inverter having an input terminal coupled to the power terminal; and
a back-up power storage device coupled to the power terminal, transforming the power to back-up power, wherein the first inverter is powered by the back-up power when a power glitch occurs on the power terminal, and the power glitch is reflected at an output terminal of the first inverter; and
a D flip-flop, having a D terminal coupled to the output terminal of the first inverter, a clock terminal coupled to the power terminal, and a Q terminal,
wherein the power glitch is detected when the Q terminal of the D-flip-flop is at a high level.

15. A chip with power-glitch detection, comprising:
a power terminal, receiving power;
a first inverter having an input terminal coupled to the power terminal; and
a back-up power storage device coupled to the power terminal, transforming the power to back-up power, wherein the first inverter is powered by the back-up power when a power glitch occurs on the power terminal, and the power glitch is reflected at an output terminal of the first inverter;
a second inverter, coupled to the first inverter to form a first latch for latching an output of the first inverter; and
a reset circuit, resetting the first latch for detection of a next power glitch.

16. The chip with power-glitch detection as claimed in claim 15, wherein:
the reset circuit comprises a first reset transistor and a second reset transistor, wherein the first reset transistor is a PMOS for disconnecting the back-up power from the first inverter when a reset signal is asserted, and the second reset transistor is an NMOS for connecting the output terminal of the first inverter to a ground terminal when the reset signal is asserted.

17. The chip with power-glitch detection as claimed in claim 16, wherein:
the first latch further comprises an NMOS that has a gate terminal coupled to an output terminal of the second inverter, a drain terminal coupled to a drain terminal of a PMOS of the first inverter, and a source terminal coupled to a drain terminal of an NMOS of the first inverter; and
the output terminal of the first inverter is coupled to an input terminal of the second inverter.

* * * * *